United States Patent [19]

Wieland et al.

[11] Patent Number: 4,662,072
[45] Date of Patent: May 5, 1987

[54] CHAIN SAW HAVING A BRAKING ARRANGEMENT

[75] Inventors: Dieter Wieland, Remseck; Manfred Bortfeld, Leutenbach; Walter Gernhard, Kernen, all of Fed. Rep. of Germany

[73] Assignee: Andreas Stihl, Waiblingen, Fed. Rep. of Germany

[21] Appl. No.: 788,630

[22] Filed: Oct. 17, 1985

Related U.S. Application Data

[63] Continuation-in-part of Ser. No. 558,119, Dec. 5, 1983, abandoned.

[30] Foreign Application Priority Data

Dec. 3, 1982 [DE] Fed. Rep. of Germany ....... 3244772

[51] Int. Cl.⁴ .............................................. B60T 13/04
[52] U.S. Cl. .................................... 30/382; 188/77 R
[58] Field of Search ................................... 30/381–387; 188/77 R, 166; 192/89 A, 129 R

[56] References Cited

U.S. PATENT DOCUMENTS 3,837,179 12/1974 Haupt et al. ........................ 30/381
4,310,972 1/1982 Isberg et al. ........................ 30/382

Primary Examiner—Douglas D. Watts
Attorney, Agent, or Firm—Walter Ottesen

[57] ABSTRACT

A chain saw is disclosed having a drive motor which drives the sprocket wheel of the saw chain via a transmission stage. The sprocket wheel rotates in the same direction as the drive shaft of the drive motor and drives the saw chain in such a manner that the portion thereof traversing the lower periphery of the cutter bar moves toward the housing of the chain saw. The saw chain is braked with a braking arrangement which develops a braking moment that causes the chain saw to develop a reaction moment that opposes the kickback moment occurring as a consequence of the kickback action. In this way, the angle through which the chain saw is deflected during kickback is reduced. In addition, a compact configuration of the motor housing of the chain saw is obtained wherein the braking arrangement is kept free of dirt and chips.

11 Claims, 6 Drawing Figures

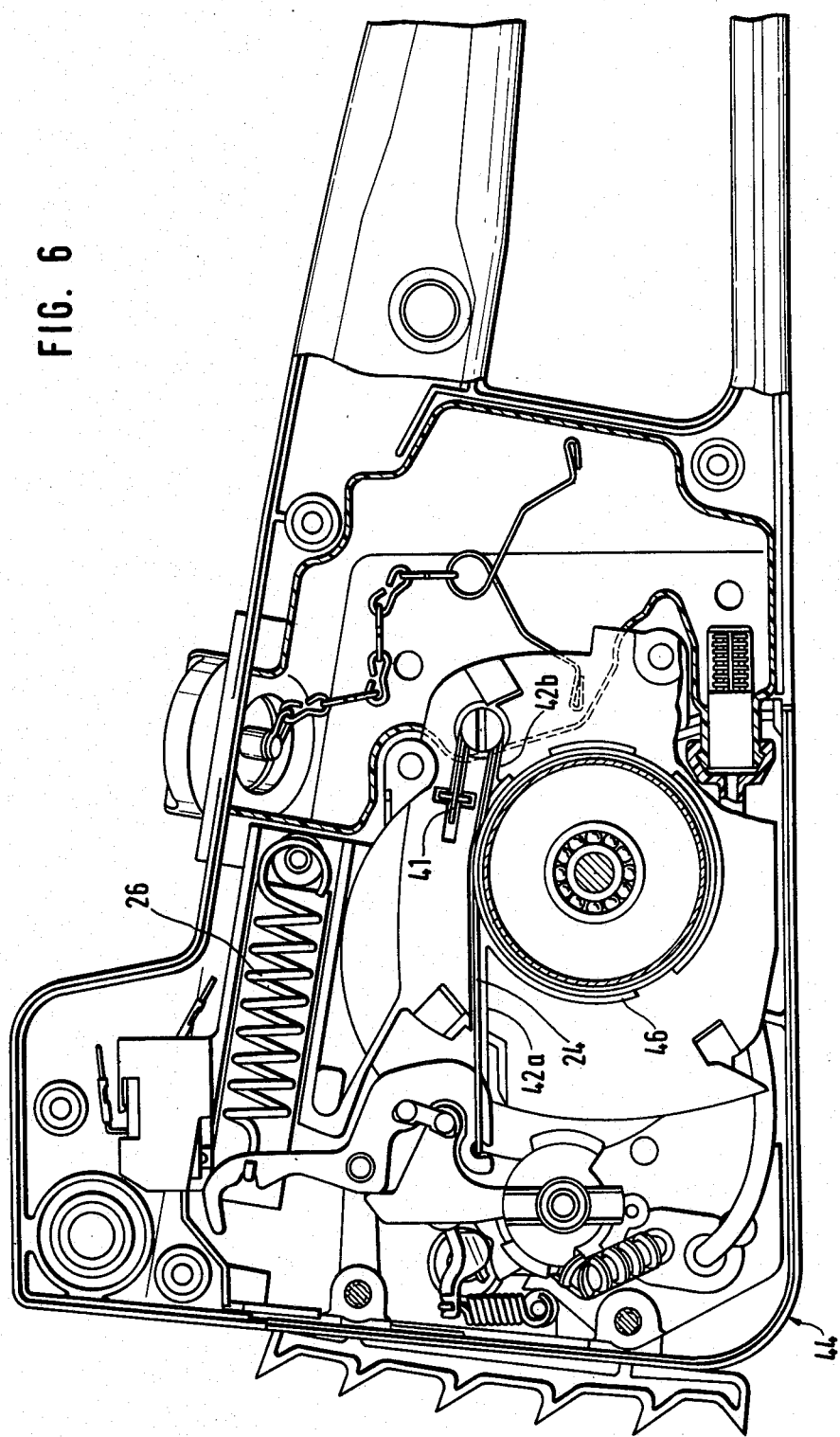

CHAIN SAW HAVING A BRAKING ARRANGEMENT

RELATED APPLICATION

This is a continuation-in-part of application Ser. No. 558,119, filed Dec. 5, 1983 and entitled "Chain Saw Having A Braking Arrangement", now abandoned.

FIELD OF THE INVENTION

The invention relates to a chain saw having a braking arrangement for reducing the kickback effect as well as a chain saw wherein the braking arrangement is kept free of chips and dirt.

BACKGROUND OF THE INVENTION

A chain saw is disclosed in U.S. Pat. No. 3,857,179 wherein the sprocket wheel is fixed with respect to a hollow wheel of the transmission. The hollow wheel has an internal gear that meshes with a pinion on the drive shaft. If the chain saw is inadvertently driven into the wood to be cut with the front end of the cutter bar, the chain saw will be thrown back toward the operator in what is known as the kickback effect. The chain saw will kick back through a relatively large angle whereby a substantial danger is presented to the person operating the chain saw.

SUMMARY OF THE INVENTION

It is an object of the invention to provide a chain saw wherein the angle through which the chain saw is kicked back is a minimum.

It is another object of the invention to provide a chain saw having a compact motor housing wherein the brake arrangement is kept free of chips and dirt.

The chain saw according to the invention is subject to a kickback moment during wood cutting operations. The chain saw includes a housing, a saw chain, and a cutter bar attached to the housing for accommodating the saw chain for circulating movement about the periphery of the cutter bar. A drive motor is mounted in the housing and has a motor drive shaft rotatable in a given rotational direction. An output shaft is disposed parallel to the drive shaft and a gear transmission connects the drive shaft to the output shaft so as to cause the latter to rotate in the same rotational direction as the drive shaft. A sprocket wheel is mounted on the output shaft for driving the saw chain around the cutter bar so as to cause the portion of the chain saw traversing the lower periphery of the cutter bar to move in a direction toward the housing. The drive shaft, the gear transmission, and the output shaft, all conjointly define a power train for transmitting the torque of the motor to the sprocket wheel. A braking arrangement is activated during the kickback condition for applying a braking moment to the power train to cause the chain saw to develop a reaction moment which acts in a direction opposing the kickback moment.

In a chain saw according to an embodiment of the invention, a braking arrangement is actuated when the kickback condition occurs and brakes the saw chain. The braking moment of the braking arrangement causes the chain saw to develop a reaction moment which acts to oppose the kickback moment which occurs during kickback. The two mutually opposing moments reduce the angle through which the chain saw would be deflected backwardly toward the operator during the kickback condition. In this way, the danger to the person operating the chain saw is substantially reduced.

The braking arrangement of the chain saw according to this embodiment of the invention has two functions which both serve to insure the safety of the person operating the chain saw. On the one hand, the saw chain is momentarily braked by the braking arrangement when the chain saw kicks back so that it no longer continues to run and, on the other hand, the braking arrangement causes a reaction moment to be developed which operates to oppose the kickback moment whereby the kickback angle of the chain saw is reduced. As a consequence of this double safety condition, the person operating the chain saw is protected to a high degree with the chain saw according to the invention.

The chain saw according to another embodiment of the invention includes a motor housing defining a motor compartment and a gear compartment with a partition wall between the compartments. The brake band and the brake drum of the braking arrangement are disposed within the motor compartment and are shielded from chips and dirt. A fan wheel is mounted on the motor armature shaft for passing cooling air through the motor compartment. The fan wheel includes a fan wall and is mounted so that the fan wall shields the brake band and brake drum from chips and dirt entrained in the cooling air as well as from any carbon and graphite dust developed during operation of the electric motor.

BRIEF DESCRIPTION OF THE DRAWING

The invention will now be described with reference to the drawing wherein.

DESCRIPTION OF THE PREFERRED EMBODIMENTS OF THE INVENTION

The chain saw has a drive motor 1 (FIG. 4) which is an electric motor in the embodiment shown. However, the motor could also be an internal combustion engine.

Figure 1:
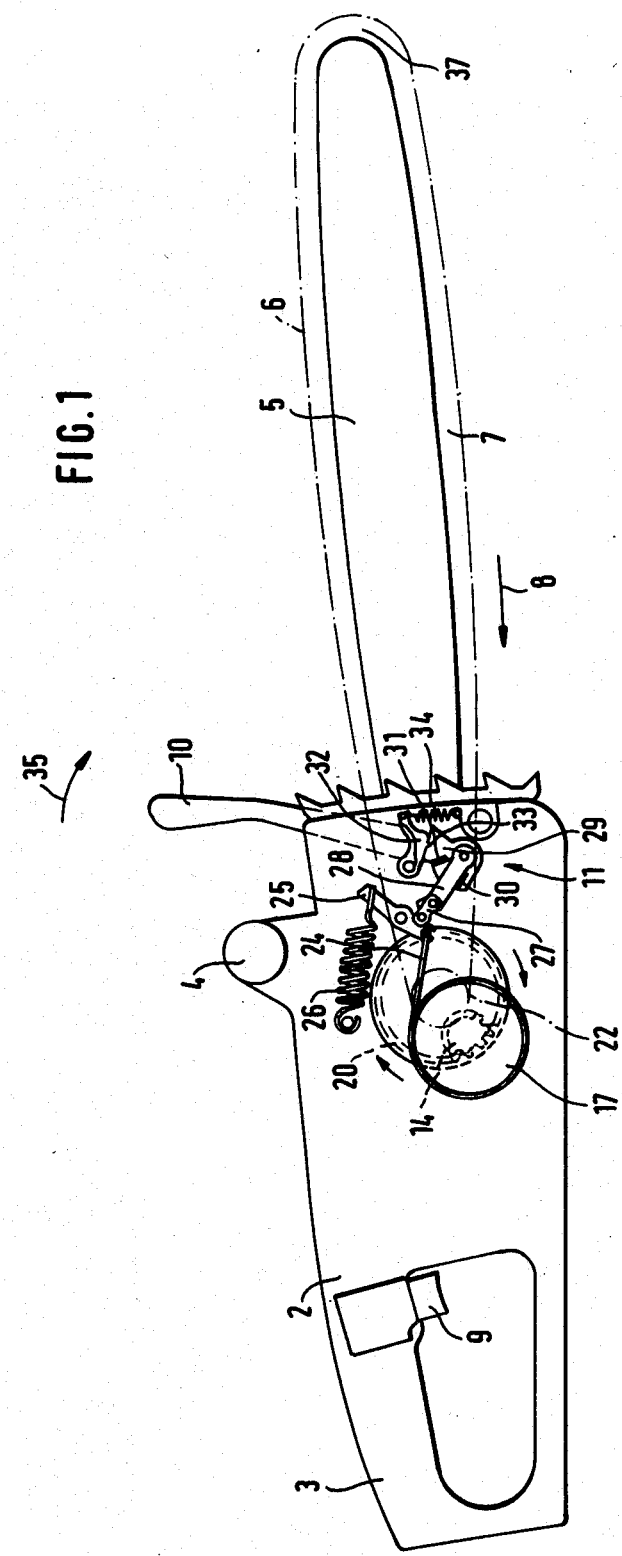
FIG. 1 is a schematic representation of the chain saw according to the invention wherein the braking arrangement is in its rest/position.

Referring to FIG. 1, electric motor 1 is arranged in the housing 2 on which a rear handle 3 and a forward handle 4 are provided for holding the chain saw. The saw chain 6 moves about the cutter bar 5 in a circulating motion which is effected in such a manner that the portion of the chain traversing the lower periphery of the cutter bar runs in a direction toward the housing 2 as indicated by arrow 8. A switch 9 is provided at the rear handle 3 by means of which the electric motor can be switched on and off.

A guard lever 10 is arranged in the area in front of the handle 4 and is associated with a braking arrangement 11 for braking the saw chain 6.

The electric motor 1 has an armature shaft 12 (FIG. 4), on which a fan wheel 13 and a pinion 14 are fixedly mounted to rotate with the armature. The pinion 14 is part of a gear transmission 15 mounted in a gear compartment 50. A cup-shaped brake drum 17 is mounted in a motor compartment 40 on the motor drive shaft 12 in the region between the fan wheel 13 and the pinion 14 by means of a bushing 16. A partition wall separates the motor compartment 40 from the gear compartment 50. The brake drum 17 is fixedly mounted to the drive shaft for rotation therewith and is part of a braking arrangement 11. The pinion 14 is rotatably supported in the housing 2 by a bearing 18 which is preferably a ball bearing and which is mounted in partition wall 44. The pinion 14 meshes with the internal gear 19 of a hollow wheel 20 of the gear transmission 15. The hollow wheel 20 is fixedly mounted to the output shaft 21 for rotation therewith. The shaft 21 extends in a direction parallel to the armature shaft 12 and is rotatably supported with respect to the housing as shown. A sprocket 22 is mounted at the free end of the shaft 21 and guides and drives the saw chain 6.

The brake drum 17 has a brake surface 23 which is defined by a flange 17a of the brake drum 17. The braking arrangement 11 further includes a brake band 24 (FIG. 1) which is secured at its one end 41 (FIG. 6) to the housing 2 and with its other end to the pivotally-mounted lever 25. The brake band 24 is likewise mounted in the motor compartment 40.

Figure 4:
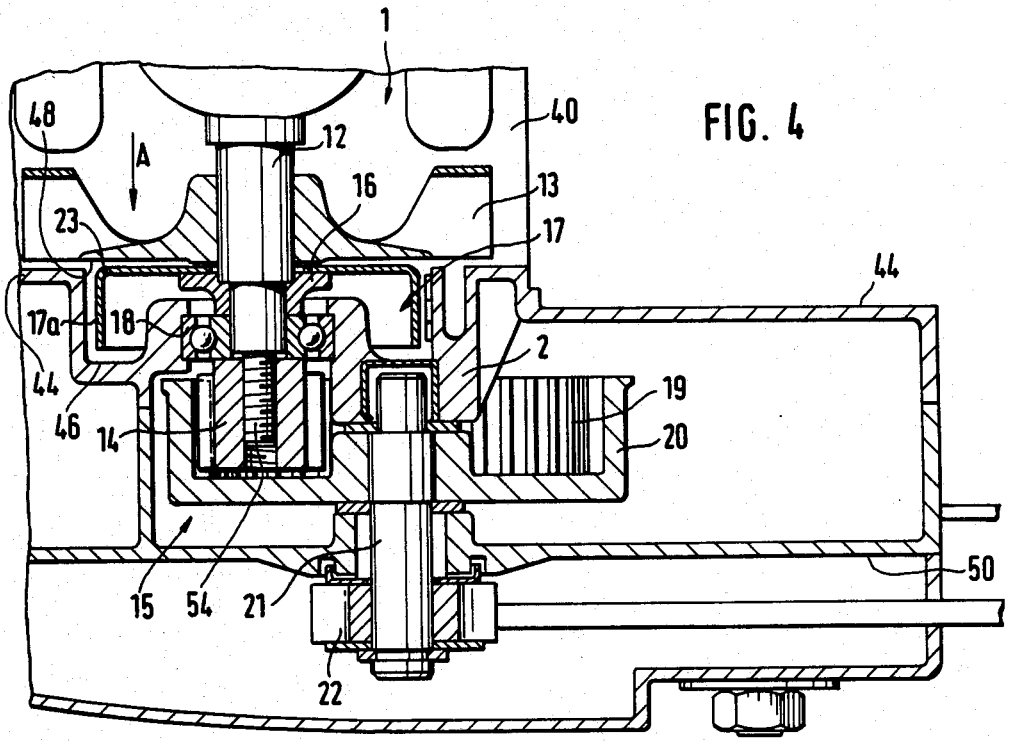
FIG. 4 is an enlarged view, partially in section, of the gear housing showing the gear transmission connecting the motor drive shaft to the output shaft on which the sprocket wheel is mounted.

Referring to FIGS. 4 and 6, the brake band 24 is disposed in slot-like recesses 42a and 42b in the wall 44 of the motor housing 2 and the brake drum 17 is disposed in a recess 46 of wall 44. The recess 46 communicates with recesses 42a and 42b so that the brake band 24 can be disposed in surrounding relationship to the brake drum 17. Thus, both brake band 24 and brake drum 17 are arranged within the motor compartment 40 and are kept free of wood chips and dirt during operational use of the chain saw.

On the other hand, the brake drum 17 and brake band 24 are covered by the rear wall 48 of fan wheel 13 so that carbon and graphite dust from the brushes of the electric motor 1 cannot reach the region of the braking arrangement. Also, any wood chips and dirt from outside the motor housing which may be drawn in with the cooling air by the fan wheel 13 are likewise kept away from the braking arrangement. Accordingly, chips and dirt as well as carbon-graphite dust are kept away from the interface of flange 17a of the brake drum 17 and the brake band 24 thereby providing a reliable braking action.

With the braking arrangement of the invention located in the motor compartment 40, it is also shielded from lubricant in the gear compartment 50 by the wall 44 which would otherwise adversely affect the operation of the braking arrangement.

The brake drum 17 is disposed within the motor compartment 40 and the bearing 18 is disposed within the brake drum 17. The brake drum 17 and bearing 18 are approximately at the same location on the armature shaft 12 and the pinion 14 is directly adjacent the bearing 18. This arrangement provides for a very compact overall motor housing configuration and saves substantial space.

Also, the projection 54 of the armature shaft 12 on which the pinion 14 is mounted is very short as shown in FIG. 4. In this way, the deflection of the armature shaft caused by peripheral forces acting on the pinion 14 is held to a low value so that the threaded projection 54 can be made thinner and a savings in weight is realized.

Because the bearing 18 is disposed directly next to both pinion 14 and brake drum 17, the deformation imparted to the armature shaft 12 by the peripheral forces applied to the brake drum on the one hand and the peripheral forces applied to the pinion 14 on the other hand are held to low values so that also the armature shaft as a whole can be made thinner than would otherwise be possible. Accordingly, a substantial savings in weight is realized which is a significant factor for handheld portable tools such as a chain saw.

Figure 3:
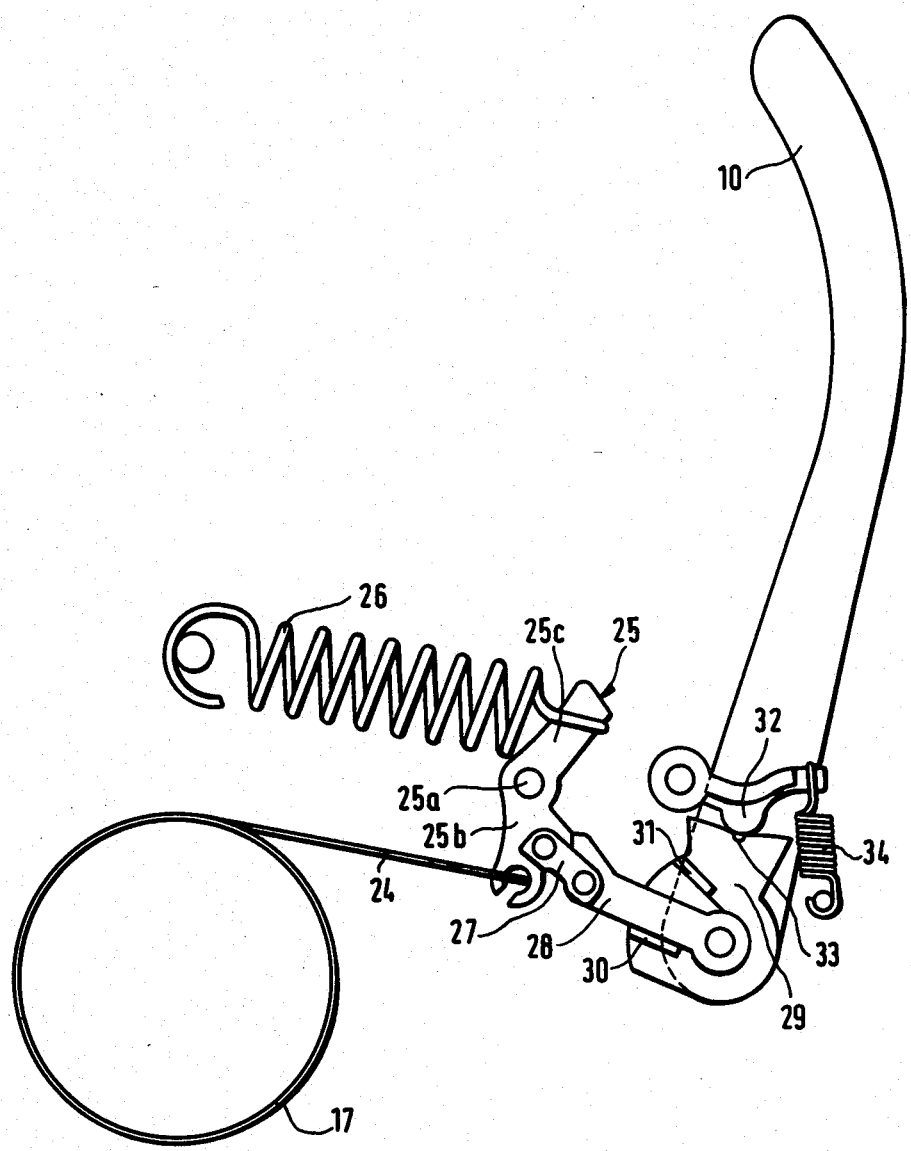
FIG. 3 is an enlarged view showing the various parts of the braking arrangement for the rest position shown in FIG. 1.

Lever 25 is configured as a two-arm lever and is pivotally mounted on the housing 2. The fulcrum of the two-arm lever is identified by reference numeral 25a. Specifically, the brake band 24 is secured to one arm 25b of the lever 25 and a tension spring 26 is secured to the other arm 25c of the lever. The other end of the spring 26 is secured to the housing. On the arm 25b to which the brake band 24 is secured, a further lever arm 27 is pivotally connected as shown in FIG. 3. At its other end, the lever 27 is pivotally connected to a lever arm 28. The two lever arms 27, 28 conjointly define a hinge by means of which the lever 25 is held in its rest position against the tension biasing force of the tension spring 26.

At its other end, the arm 28 is pivotally connected to a control part 29 of the guard lever 10. The control part 29 is arranged at the free end of the guard arm 10 in the housing 2. The control part 29 includes two stops 30, 31 which act as dogs for the arm 28.

For the rest condition shown in FIGS. 1 and 3, the lever arms 27 and 28 are shown extended. Furthermore, the arm 28 is braced against the stop 30 of the control part 29. In this position, the guard lever 10 is held by means of latch lever 32 which engages a recess 33 of the control part 29. A tension spring 34 is fixedly mounted to one end of the housing and, at its other end, is attached to the latch lever 32 as shown. The latch lever 32 is pivotally mounted to the housing 2 and is configured as a single arm lever having a free end on which the tension spring 34 is attached and applies a pulling force to the lever which helps hold it in its latch position shown in FIG. 1.

Figure 2:
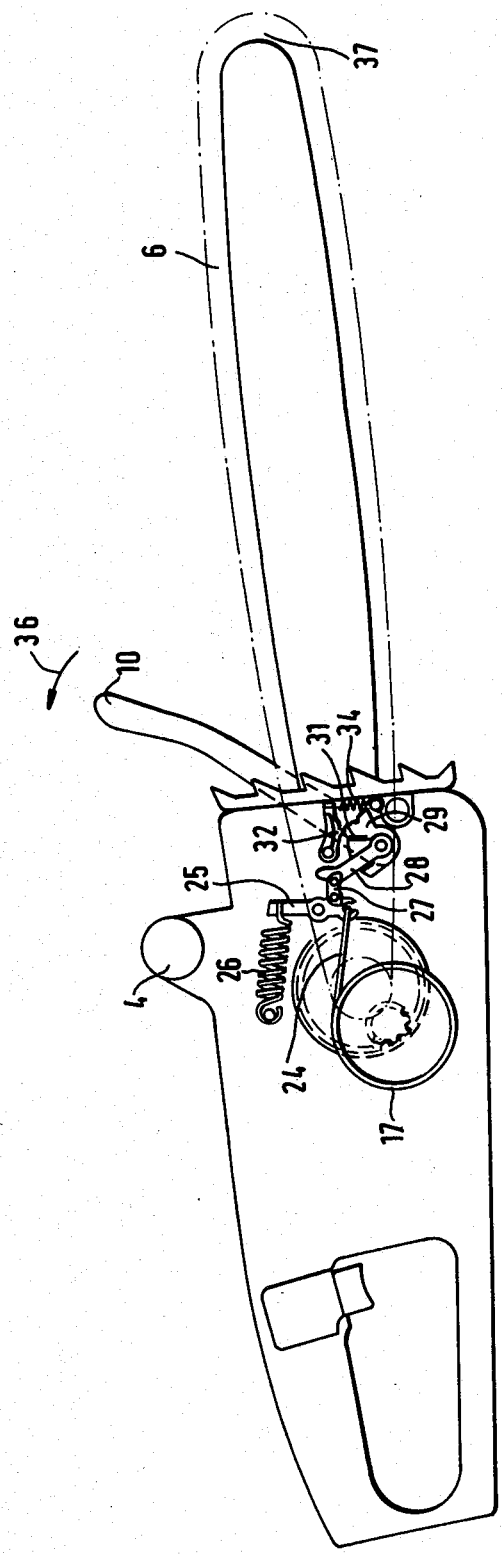
FIG. 2 is a schematic representation of the chain saw wherein the braking arrangement is in its activated condition.

If the hand of the operator of the chain saw slips off of the handle 4, which is indeed the case during the kickback condition, then the guard lever 10 is caused to swing in the direction indicated by arrow 35 so that the braking arrangement and guard lever 10 are in the position as shown in FIG. 2. For this condition, the control part 29 is likewise pivotally rotated whereby the stop 30 imparts a rotary movement to lever arm 28 in the clockwise direction. The tension biasing force of tension spring 34 is selected so that the force developed by the hand of the operator striking the guard lever is so large that this biasing force is overcome. In this way, the latch lever 32 will be forced out of its recess 33 when the control part 29 is pivotally rotated. As soon as the latching lever 32 is forced out of its recess 33, the lever 25 is pivotally moved in the counter-clockwise direction by means of the very strong tension force of pre-stressed tension spring 26 thereby causing the brake band 24 to be applied to the brake drum 17. Since the brake drum 17 is tightly secured to the armature shaft 12, the latter will be momentarily halted whereby the sprocket wheel 22 will likewise be braked. The saw chain 6 is in this way momentarily stopped during a dangerous condition.

In order to return the chain saw to its operating condition, the guard lever 10 is pivotally rotated in the direction of arrow 36 (FIG. 2) to its previous position. With this movement, the stop 31 is brought into contact engagement with the arm 28 and pivotally rotates the latter in the counter-clockwise direction. The lever 25 is rotated in the clockwise direction back to its initial position by means of the arm 27 against the force of tension spring 26 until the latch lever 32 under the force of tension spring 34 again engages the recess 33 of the control part 29. In this way, the lever arms 27 and 28 are held in their extended position as shown in FIG. 1 against the force of the tension spring 26. The brake band 24 is then at a very small spacing from the brake drum 17 so that the armature shaft 12 can again be rotated and, via the drive transmission 14, 15, 21, the sprocket 22 and therefore the saw chain 6 can again be driven.

In the embodiment illustrated, the guard lever 10 is an actuating member of the braking arrangement 11 which is manually pivoted. The guard lever 10 can, however, also be configured to actuate automatically, for example, as a consequence of inertial forces occurring during the kickback action thereby pivoting and initiating the braking action to halt the saw chain.

Figure 5:
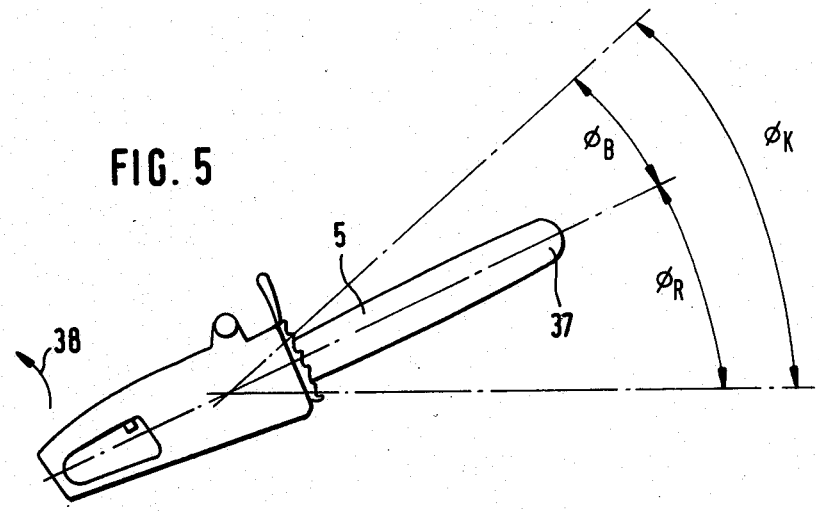
FIG. 5 is a schematic representation of the chain saw showing the kickback angle and the amount to which this angle is reduced by the chain saw according to one embodiment of the invention; and, FIG. 6 is a side elevation view of the entire end wall of the motor housing as viewed in the direction of arrow A of FIG. 5 and reduced in size.

The armature shaft 12 and the sprocket wheel 22 rotate in the clockwise direction when viewed in the direction of their respective axes and this is illustrated by arrows in FIG. 1. In this way, the lower portion of the saw chain 6 is caused to move in the direction of arrow 8. More specifically, the saw chain has a circulating movement about the cutter bar and the lower portion thereof moves in the direction of arrow 8 toward the housing 2. If the person operating the chain saw penetrates the material to be cut thereby with the nose 37 of the cutter bar 5 then the so-called kickback action will occur. In this condition, the entire chain saw is deflected in the direction of arrow 38 (FIG. 5). That is, the chain saw is kicked back in the direction toward the person operating the chain saw. In known chain saws, this kickback moment causes the chain saw to swing through a deflecting kickback angle $\phi_K$ as shown in FIG. 5.

As a consequence of the embodiment according to the invention, this deflecting kickback angle is substantially reduced. The brake drum 17 is mounted on the armature drive shaft 12 and sprocket wheel 22 is connected to the drive motor 1 through at least one gearing stage 15 and the sprocket wheel 22 and armature drive shaft 12 are driven such that the lower portion 7 of the saw chain 6 moves toward the housing. Because of this condition, the braking moment occurring during the braking of the saw chain leads to a reaction moment of the chain saw which acts to oppose the kickback moment. The deflection angle defined by the braking moment is shown in FIG. 5 and is designated by $\phi_B$. The schematic of FIG. 5 shows the extent to which the kickback angle of the chain saw is reduced by the opposing moment. The deflection angle resulting from the reaction moment and the kickback moment of the chain saw is $\phi_R$ which is obtained from the equation: $\phi_R = \phi_K - \phi_B$. Compared to known chain saws wherein the deflection angle is $\phi_K$, the chain saw according to the invention has a deflection angle which is substantially reduced, namely, by an amount $\phi_B$. In this way, the danger is reduced that the person operating the chain saw will be injured by a chain saw subjected to the kickback action.

According to another embodiment of the invention, the brake drum 17 can also be mounted on the shaft 21. In this situation, the braking action is transmitted from shaft 21 whereby the motor drive shaft 12 is braked via the hollow wheel 20 and the pinion 14.

It is understood that the foregoing description is that of the preferred embodiments of the invention and that various changes and modifications may be made thereto without departing from the spirit and scope of the invention as defined in the appended claims.

What is claimed is:

1. A chain saw subject to a kickback moment during wood cutting operations, the chain saw comprising:
   a housing defining a motor compartment and a gear compartment, said housing including a partition wall between said compartments;
   a saw chain;
   a cutter bar attached to said housing for accomodating said saw chain for circulating movement about the periphery of said cutter bar;
   a drive motor mounted in said motor compartment and having a motor drive shaft rotatable in a given rotational direction, said drive shaft being rotatably journalled in and extending through said partition wall into said gear compartment;
   a fan wheel mounted on said motor drive shaft for passing cooling air through said motor compartment, said fan wheel including a fan wall adjacent said partition wall;
   an output shaft mounted in said gear compartment and parallel to said drive shaft.
   gear transmission means for connecting said drive shaft to said output shaft in said gear compartment so as to cause said output shaft to rotate in the same rotational direction as said drive shaft;
   sprocket means mounted on said output shaft to likewise rotate in said rotational direction for driving said saw chain around said cutter bar so as to cause the portion of the saw chain traversing the lower part of the cutter bar to move in the direction toward said housing;
   said drive shaft, said gear transmission means and said output shaft conjointly defining a power train for transmitting the torque of said motor to said sprocket means; and,
   braking means activated during a kickback condition for applying a braking moment to said power train to cause the chain saw to develop a reaction moment which acts in a direction opposing said kickback moment,
   said braking means including:
   a brake drum fixedly mounted on said motor drive shaft in said motor compartment for rotation with said drive shaft;
   brake band means disposed in surrounding relationship to said brake drum;
   first recess means formed in said partition wall directly adjacent said fan wall so as to face into the interior of said motor compartment;
   second recess means formed in said partition wall so as to communicate with said first recess means and to also face into the interior of said motor compartment;

said brake drum being positioned on said shaft directly next to said fan wall and in said first recess means and said brake band means being disposed in said second recess means thereby providing a compact configuration of said fan wheel, said brake drum and said brake band means within said motor compartment;

spring means for resiliently biasing said brake band means in a direction for braking contact engagement with said brake drum; and, lever means connected to said brake band means and movable between a first position wherein said brake band means is held in a relaxed condition and a second position corresponding to the kickback condition wherein said brake band means is released to tightly engage said brake drum under the force of said spring means whereby said reaction moment is developed to reduce said kickback moment.

2. The chain saw of claim 1, said drive motor being an electrical motor.

3. The chain saw of claim 1, said brake drum being fixedly mounted on said motor drive shaft whereby the braking moment developed by said brake band means acts directly upon said drive shaft.

4. The chain saw of claim 1, said gear transmission means including: a pinion on said motor drive shaft; a hollow drum-like member fixedly mounted on said output shaft and having an internal gear formed therein for meshing with said pinion.

5. The chain saw of claim 4, said brake drum being mounted on said motor drive shaft behind said pinion.

6. A chain saw subject to a kickback moment during wood cutting operations, the chain saw comprising:

a housing defining a motor compartment and a gear compartment, said housing including a partition wall between said compartments;

a saw chain;

a cutter bar attached to said housing for accomodating said saw chain for circulating movement about the periphery of said cutter bar;

a drive motor mounted in said motor compartment and having a motor drive shaft rotatable in a given rotational direction, said drive shaft extending through said partition wall into said gear compartment;

bearing means for journalling said motor drive shaft in said partition wall;

an output shaft mounted in said gear compartment and parallel to said drive shaft;

gear transmission means for connecting said drive shaft to said output shaft in said gear compartment so as to cause said output shaft to rotate;

sprocket means arranged in said gear compartment and mounted on said output shaft to likewise rotate for driving said saw chain around said cutter bar;

said drive shaft, said gear transmission means and said output shaft conjointly defining a power train for transmitting the torque of said motor to said sprocket means; and, braking means activated during a kickback condition for applying a braking moment to said power train to cause the chain saw to develop a reaction moment;

said braking means including:

a brake drum fixedly mounted on said motor drive shaft in said motor compartment for rotation with said drive shaft;

brake band means also disposed in said motor compartment and in surrounding relationship to said brake drum;

said brake drum being mounted on said motor drive shaft so as to be directly next to said partition wall and said bearing means thereby means thereby reducing any deformation imparted to said motor drive shaft by the force applied to said brake drum by said brake band means when said braking means is actuated;

said brake drum and said brake band means being completely isolated from said gear compartment and said saw chain by said partition wall whereby said brake band means and said brake drum are shielded from chips and dirt from outside of said motor compartment;

spring means for resiliently biasing said brake band means in a direction for braking contact engagement with said brake drum; and, lever means connected to said brake band means and movable between a first position wherein said brake band means is held in a relaxed condition and a second position corresponding to the kickback condition wherein said brake band means is released to tightly engage said brake drum under the force of said spring means.

7. The chain saw of claim 6, comprising a fan wheel mounted on said motor drive shaft for passing cooling air through said motor compartment, said fan wheel including a wall directly adjacent said brake drum and said brake band means so as to shield the same from chips and dirt entrained in the cooling air passed through said compartment.

8. The chain saw of claim 7 wherein said motor is a brush operated electric motor which develops carbon and graphite dust, said wall of said fan wheel also shielding said brake band means and said brake drum from said dust.

9. A chain saw subject to a kickback moment during wood cutting operations, the chain saw comprising:

a housing defining a motor compartment and a gear compartment, said housing including a partition wall between said compartments;

a saw chain;

a cutter bar attached to said housing for accommodating said saw chain for circulating movement about the periphery of said cutter bar;

a drive motor mounted in said motor compartment and having a motor drive shaft rotatable in a given rotational direction, said drive shaft extending through said partition wall into said gear compartment;

an output shaft mounted in said gear compartment and parallel to said drive shaft;

gear transmission means for connecting said drive shaft to said output shaft in said gear compartment so as to cause said output shaft to rotate;

sprocket means mounted on said output shaft to likewise rotate for driving said saw chain around said cutter bar;

said drive shaft, said gear transmission means and said output shaft conjointly defining a power train for transmitting the torque of said motor to said sprocket means; and, braking means activated during a kickback condition for applying a braking moment to said power train to cause the chain saw to develop a reaction moment;

said braking means including:
a brake drum fixedly mounted on said motor drive shaft in said motor compartment for rotation with said drive shaft;
brake band means also disposed in said motor compartment and in surrounding relationship to said brake drum whereby said brake band means and said brake drum are shielded from chips and dirt from outside of said housing;
spring means for resiliently biasing said brake band means in a direction for braking contact engagement with said brake drum;
lever means connected to said brake band means and movable between a first position wherein said brake band means is held in a relaxed condition and a second position corresponding to the kickback condition wherein said brake band means is released to tightly engage said brake drum under the force of said spring means; and,
bearing means for journalling said motor drive shaft in said partition wall, said brake drum being cup-shaped and having a flange for coacting with said brake band means, said brake drum being disposed directly next to said bearing means so as to cause said flange to overlap said bearing means in spaced relationship thereto whereby an axial compact configuration of said bearing means and said brake drum is achieved.

10. The chain saw of claim 9, said pinion being disposed in said gear compartment directly next to said partition wall.

11. The chain saw of claim 7, comprising recess means formed in said partition wall for accommodating said brake drum and said brake band means therein; said fan wall having a diameter greater than the diameter of said brake drum so as to cause said fan wall to overlap said brake drum and said recess means thereby further shielding said brake drum and said brake band means from said chips and dirt entrained in said cooling air.

* * * * *

UNITED STATES PATENT AND TRADEMARK OFFICE
CERTIFICATE OF CORRECTION

PATENT NO. : 4,662,072

DATED : May 5, 1987

INVENTOR(S) : Dieter Wieland et al

It is certified that error appears in the above-identified patent and that said Letters Patent is hereby corrected as shown below:

In column 2, line 35: delete "rest/position" and substitute -- rest position -- therefor.

In column 6, line 36: delete "shaft." and substitute -- shaft; -- therefor.

In column 8, line 6: delete "means thereby" second occurrence.

In column 9, line 11: delete "resilently" and substitute -- resiliently -- therefor.

Signed and Sealed this

Twenty-ninth Day of September, 1987

Attest:

DONALD J. QUIGG

Attesting Officer  Commissioner of Patents and Trademarks